US010498965B2

(12) United States Patent
Fukai et al.

(10) Patent No.: US 10,498,965 B2
(45) Date of Patent: Dec. 3, 2019

(54) IMAGE STABILIZATION APPARATUS, METHOD OF CONTROLLING THE SAME, AND STORAGE MEDIUM

(71) Applicant: CANON KABUSHIKI KAISHA, Tokyo (JP)

(72) Inventors: Yosuke Fukai, Kawasaki (JP); Shuichi Terada, Kunitachi (JP); Toshihiro Ogawa, Tokyo (JP); Nobuhiro Shibata, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/471,245

(22) Filed: Mar. 28, 2017

(65) Prior Publication Data
US 2017/0295321 A1    Oct. 12, 2017

(30) Foreign Application Priority Data

Apr. 7, 2016    (JP) .................... 2016-077578

(51) Int. Cl.
H04N 5/232    (2006.01)
H04N 5/225    (2006.01)
(Continued)

(52) U.S. Cl.
CPC .......... H04N 5/23287 (2013.01); G02B 7/09 (2013.01); G02B 27/646 (2013.01); G03B 3/10 (2013.01);
(Continued)

(58) Field of Classification Search
CPC ........... H04N 5/23287; H04N 5/23293; H04N 5/23222; H04N 5/23212; H04N 5/23251;
(Continued)

(56) References Cited

U.S. PATENT DOCUMENTS

2005/0264678 A1* 12/2005 Butterworth ........... H04N 5/232
348/345
2006/0127084 A1* 6/2006 Okada .................... G03B 17/00
396/439

(Continued)

FOREIGN PATENT DOCUMENTS

CN    101207718 A    6/2008
CN    101359085 A    4/2009
(Continued)

OTHER PUBLICATIONS

The above foreign patent documents were cited in a Aug. 29, 2019 Chinese Office Action, a copy of which is enclosed with an English Translation, that issued in Chinese Patent Application No. 201710221272.8.

Primary Examiner — Marly S Camargo
(74) Attorney, Agent, or Firm — Cowan, Liebowitz & Latman, P.C.

(57) ABSTRACT

An image stabilization apparatus includes: a driving control unit that drives an image stabilization unit to optically correct image blur of an object image caused by a shake of an apparatus, the image stabilization unit moving the object image on a screen of an image sensor; and a focus control unit that performs control to drive a focusing lens in coordination with an operation of the image stabilization unit, the focusing lens being used to perform focus adjustment in an imaging optical system.

12 Claims, 11 Drawing Sheets

(51) Int. Cl.
*G06T 5/00* (2006.01)
*G06T 7/20* (2017.01)
*G02B 7/09* (2006.01)
*G02B 27/64* (2006.01)
*G03B 3/10* (2006.01)
*G03B 5/00* (2006.01)
*G03B 13/36* (2006.01)

(52) U.S. Cl.
CPC .............. *G03B 5/00* (2013.01); *G03B 13/36* (2013.01); *H04N 5/2251* (2013.01); *H04N 5/23212* (2013.01); *H04N 5/23258* (2013.01); *H04N 5/23296* (2013.01); *G03B 2205/0007* (2013.01)

(58) Field of Classification Search
CPC ........... H04N 5/23254; H04N 5/23258; H04N 5/23296; G06T 2207/20021; G06T 2207/10016; G06T 5/20; G06T 5/001; G06T 5/003; G06T 7/20; G06T 5/50; G02B 7/09; G02B 27/646
USPC ........ 348/222.1, 208.11, 154–155, 169–172, 348/208.1, 208.14, 699, 208.2, 208.99, 348/208.4, 208.13, 345; 396/54, 153, 53, 396/52; 382/103, 107; 250/203.1, 203.7, 250/339.14, 342
See application file for complete search history.

(56) References Cited

U.S. PATENT DOCUMENTS

| | | | |
|---|---|---|---|
| 2010/0026821 A1* | 2/2010 | Sato | H04N 5/228 348/208.99 |
| 2011/0228102 A1* | 9/2011 | Hayashi | H04N 17/00 348/187 |
| 2017/0289430 A1* | 10/2017 | Seki | H04N 5/23209 348/360 |
| 2019/0215456 A1* | 7/2019 | Fukai | H04N 5/23267 348/208.6 |

FOREIGN PATENT DOCUMENTS

| | | | |
|---|---|---|---|
| CN | 102854701 A | | 2/2013 |
| JP | 2009-145852 A | * | 2/2009 |
| JP | 2009-145852 A | | 7/2009 |

* cited by examiner

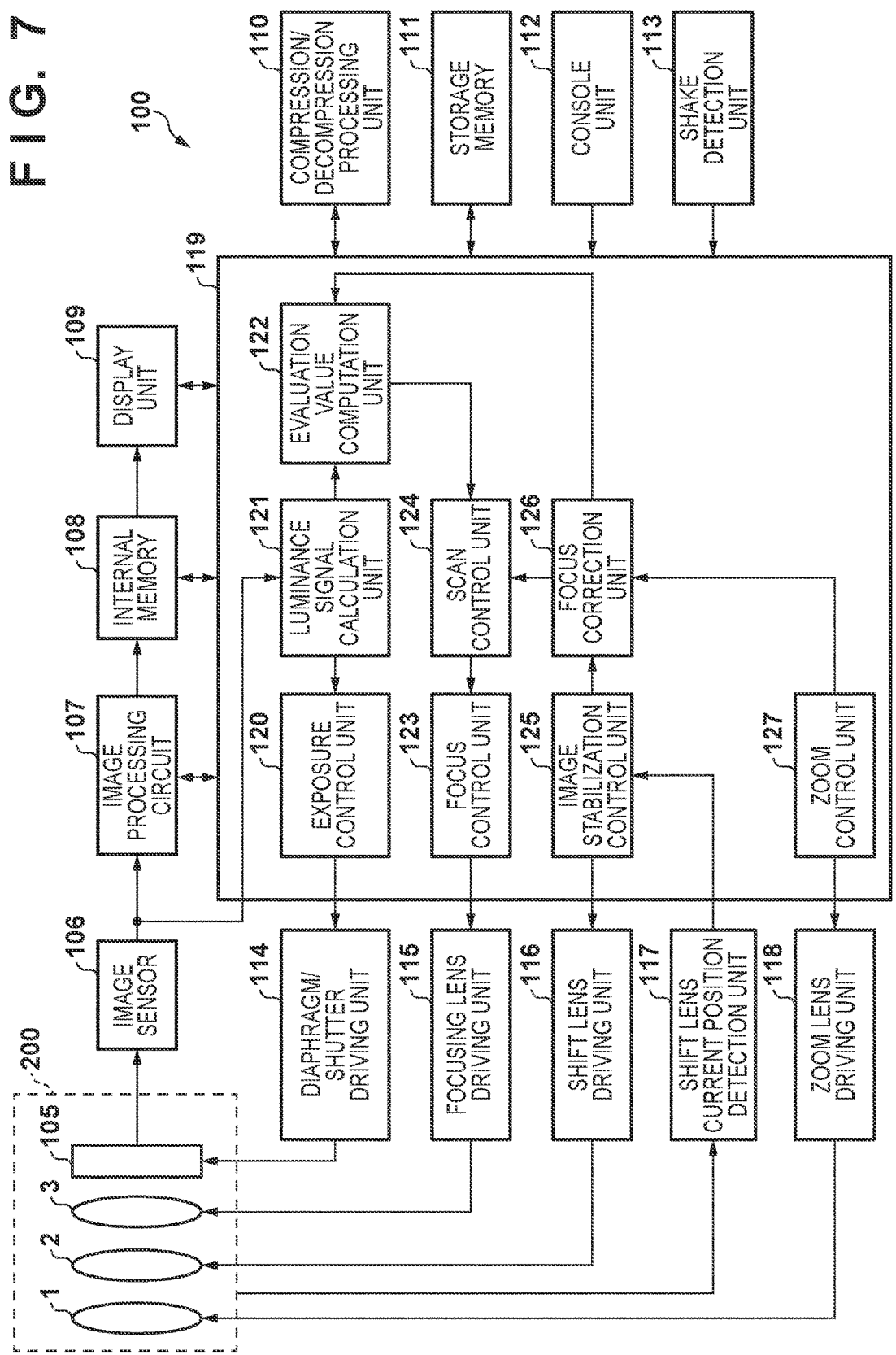

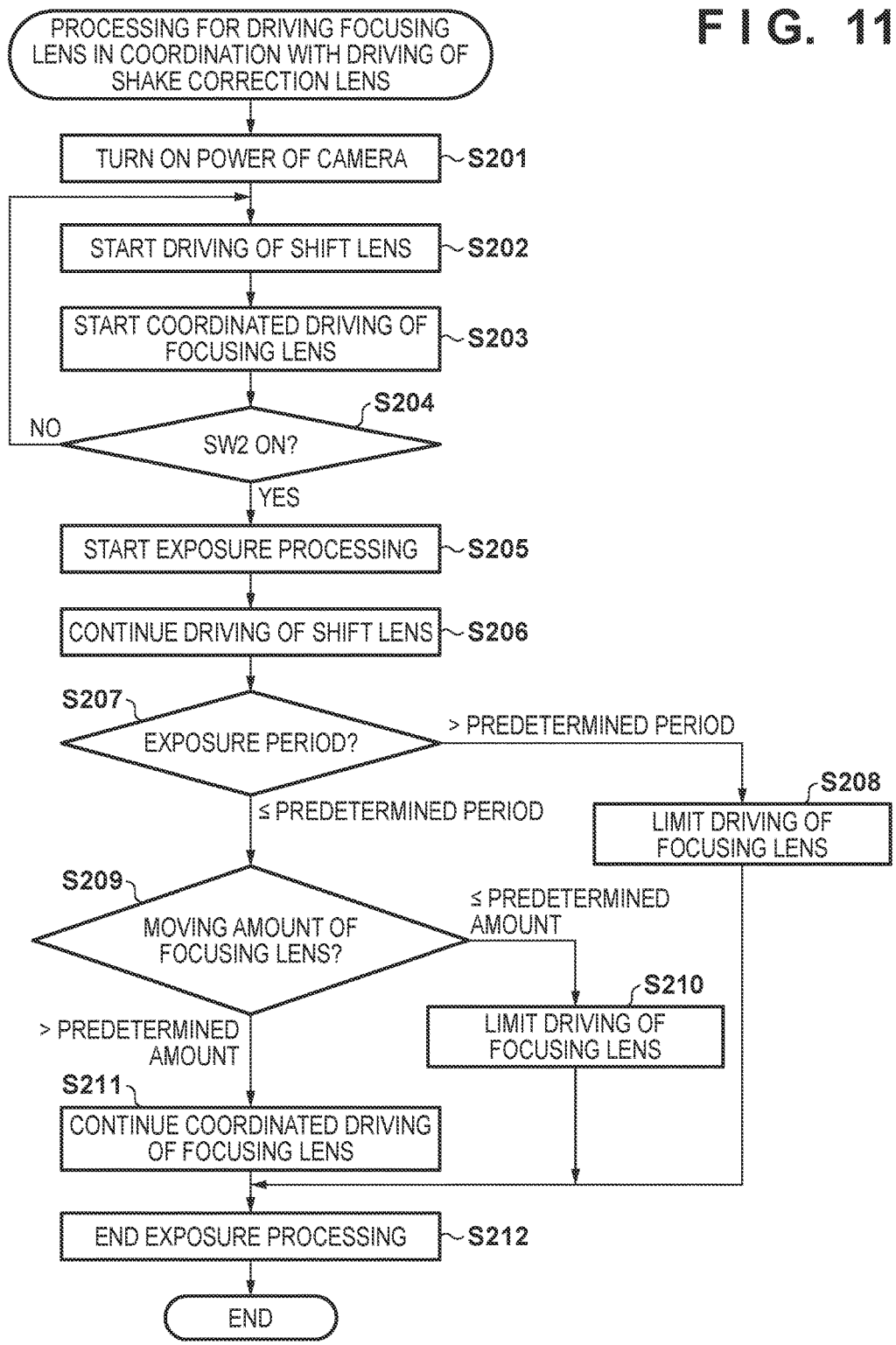

IMAGE STABILIZATION APPARATUS, METHOD OF CONTROLLING THE SAME, AND STORAGE MEDIUM

BACKGROUND OF THE INVENTION

Field of the Invention

The present invention relates to a technique for correcting defocus that is caused by driving of a shift lens in image stabilization performed on an image capturing apparatus.

Description of the Related Art

As optical systems of recent image capturing apparatuses, such as still cameras and video cameras, can achieve higher magnification, image blur attributed to swaying of the image capturing apparatuses—typically, a camera shake—is becoming more easily noticeable at the telephoto side; this has led to a demand for further improvements in the performance of an image stabilization mechanism. The image stabilization mechanism detects a camera shake caused by a photographer, and cancels out image blur attributed to the camera shake caused by the photographer by driving a part of lenses composing an imaging optical system (a shift lens) in a direction substantially perpendicular to an optical axis. That is, the image stabilization mechanism performs an operation of making the shift lens deviate from the optical axis of the entire optical system to cancel out image blur attributed to the camera shake. As mentioned earlier, in order to meet the demand for improvements in the image stabilization performance of the image stabilization mechanism, it is necessary to move the shift lens significantly, which makes the shift lens deviate from the optical axis more significantly than ever.

Meanwhile, an increasing number of pixels in recent image capturing apparatuses have made even subtle defocus easily noticeable, and hence created a demand for focusing with higher precision. One example of focusing methods is a triangulation method, which achieves focus by measuring a distance to an object using an externally installed range sensor. Another example of focusing methods is a contrast autofocus (AF) method, which performs automatic focus adjustment using AF evaluation values obtained by extracting components of a specific frequency from luminance signals obtained from an image sensor through filter processing. Furthermore, there is a technique for alleviating the influence of a camera shake on the focusing precision (Japanese Patent Laid-Open No. 2009-145852); according to this technique, a weight for a first in-focus position obtained using the triangulation method and a weight for a second in-focus position obtained using the contrast AF method are changed in accordance with the extent of the camera shake to yield a third in-focus position.

If a shift lens is driven to the point where it deviates from an optical axis significantly, the contrast of an object at a central portion of an image decreases, which lowers the optical performance. In the case of a through-the-lens image prior to the start of exposure, the contrast AF method drives a focusing lens to a position that yields high object contrast to bring a predetermined object into focus, and once the object has been brought into focus, the focusing lens is maintained at that position. However, if a camera sways due to, for example, a camera shake caused by a photographer while the object is in an in-focus state, the camera detects the shake and moves the shift lens to cancel out the shake. At this time, if the shift lens deviates from the optical axis significantly, the contrast of the object at a central portion of the through-the-lens image decreases, which places the through-the-lens image into a so-called out-of-focus state and causes discomfort to the photographer. Once the image sensor has been exposed to light, the focusing lens is fixedly held without being driven during the exposure. However, because the camera drives the shift lens upon detection of a camera shake caused by the photographer even during the exposure, there is a possibility that an image captured under the exposure may exhibit low object contrast.

SUMMARY OF THE INVENTION

The present invention has been made in view of the foregoing problems, and provides an image stabilization apparatus that achieves the necessary image stabilization effect while deterring a reduction in the image quality of a captured image.

According to a first aspect of the present invention, there is provided an image stabilization apparatus, comprising: a driving control unit that drives an image stabilization unit to optically correct image blur of an object image caused by a shake of an apparatus, the image stabilization unit moving the object image on a screen of an image capturing unit; and a focus control unit that performs control to drive a focusing lens in coordination with an operation of the image stabilization unit, the focusing lens being used to perform focus adjustment in an imaging optical system.

According to a second aspect of the present invention, there is provided a method of controlling an image stabilization apparatus, the method comprising: driving an image stabilization unit to optically correct image blur of an object image caused by a shake of an apparatus, the image stabilization unit moving the object image on a screen of an image capturing unit; and performing control to drive a focusing lens in coordination with an operation of the image stabilization unit, the focusing lens being used to perform focus adjustment in an imaging optical system.

Further features of the present invention will become apparent from the following description of exemplary embodiments with reference to the attached drawings.

BRIEF DESCRIPTION OF THE DRAWINGS

FIG. 7 is a block diagram of an image capturing apparatus according to the first embodiment of the present invention.

FIG. 11 is a flowchart of a focus correction operation according to a second embodiment.

DESCRIPTION OF THE EMBODIMENTS

The following describes embodiments of the present invention in detail with reference to the attached drawings.

First Embodiment

Figure 1:
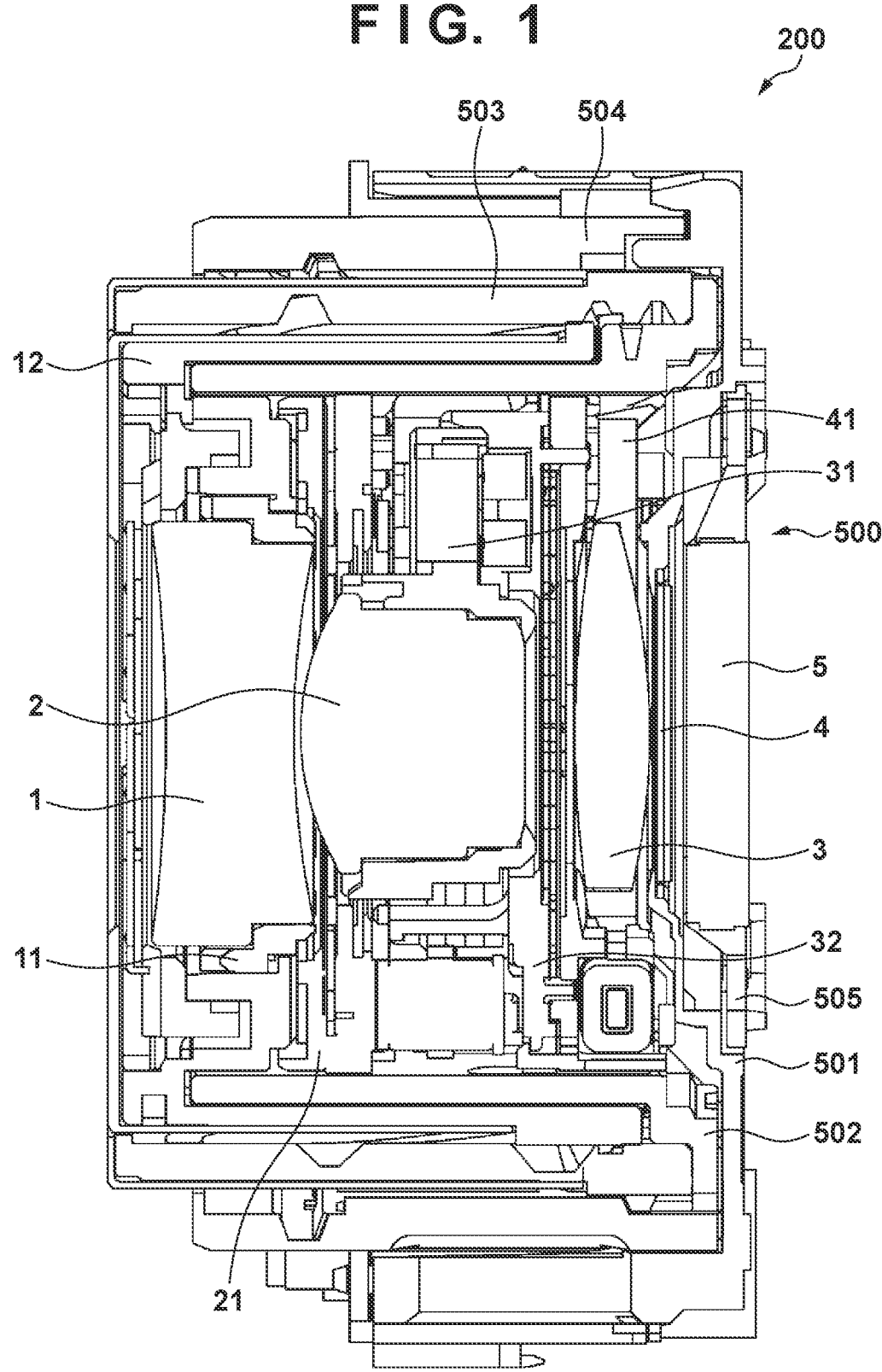
FIG. 1 shows an overall configuration of a lens according to a first embodiment of the present invention.
Figure 2:
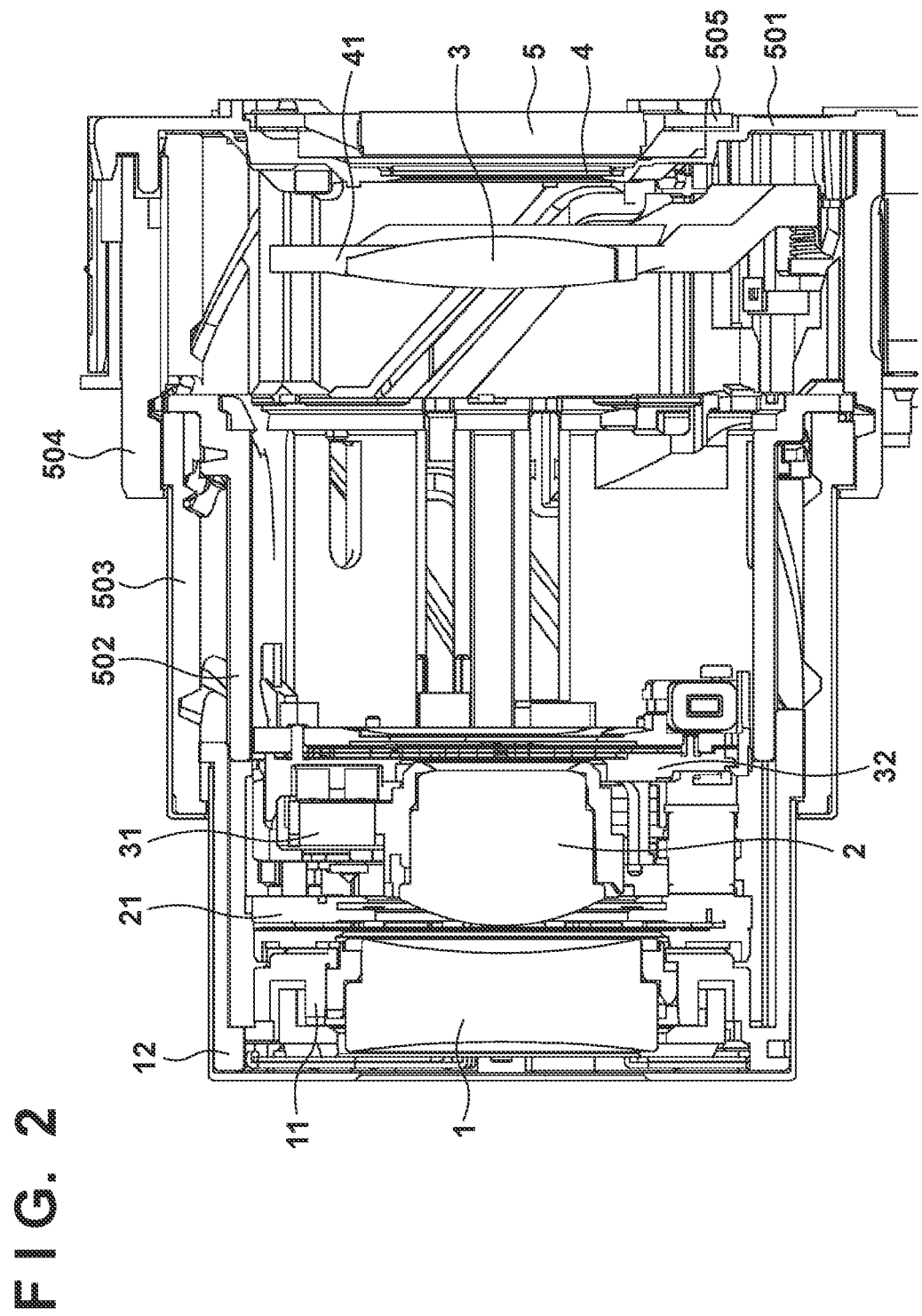
FIG. 2 shows the overall configuration of the lens according to the first embodiment of the present invention.
Figure 3:
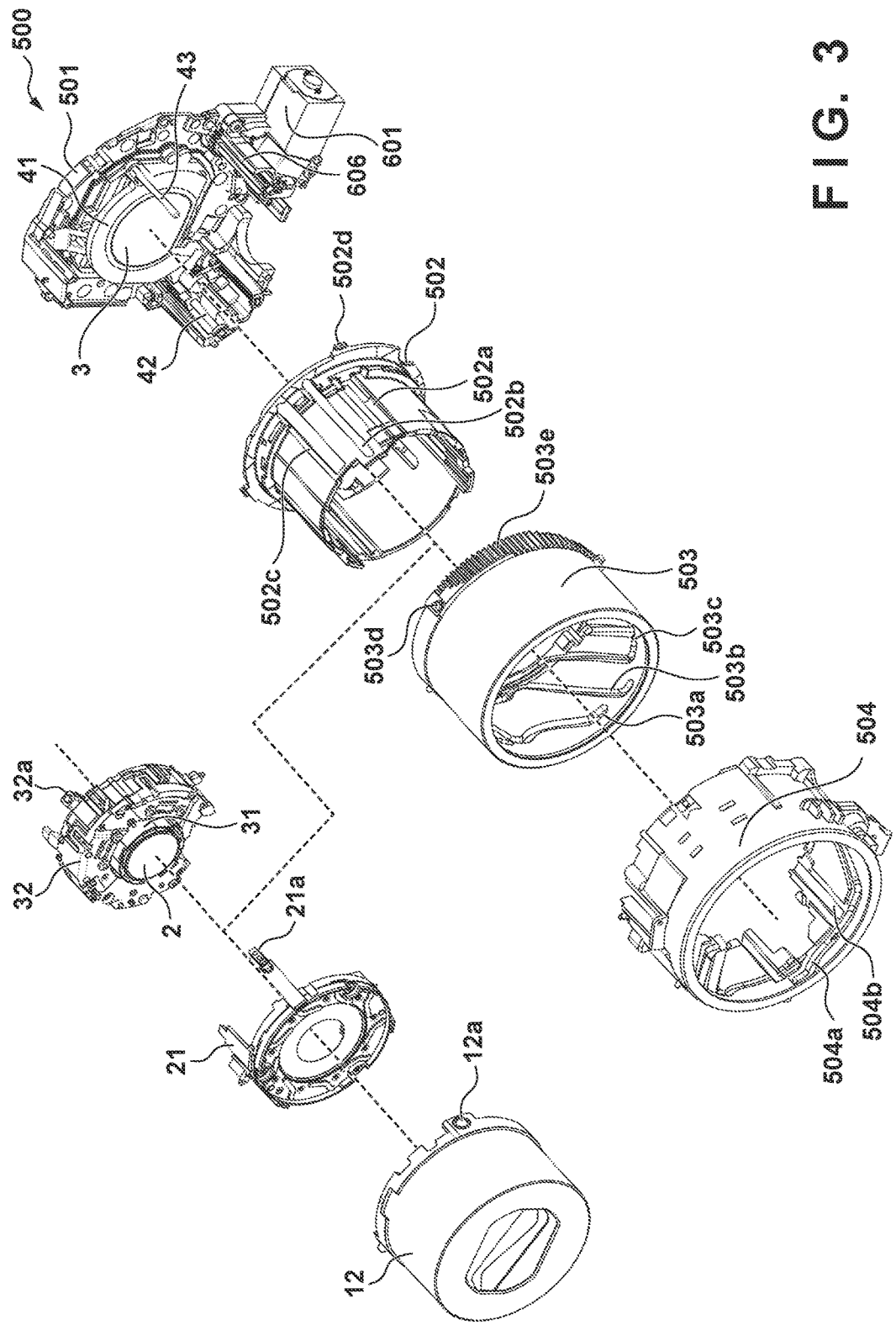
FIG. 3 shows the overall configuration of the lens according to the first embodiment of the present invention.

FIGS. 1 to 3 show an overall configuration of a lens (an imaging optical system) 200 in an image capturing apparatus according to a first embodiment of the present invention. In FIGS. 1 to 3, the lens 200 according to the present embodiment, which forms an object image, is composed of three lens assemblies. Specifically, it includes a first assembly unit composed of a first lens assembly holding frame 11 that holds a first lens assembly 1, and a first assembly base plate 12 that holds the first lens assembly holding frame 11 and includes a lens barrier member for lens protection. It also includes: a diaphragm unit 21 that serves as a light amount adjustment member during image capture; a second assembly unit composed of a second lens assembly holding frame 31 that holds a second lens assembly 2, and a second assembly base plate 32 that includes a non-illustrated shutter member; and a third assembly unit including a third lens assembly holding frame 41 that holds a third lens assembly 3. The first assembly unit, the diaphragm unit, and the second assembly unit are variable magnification lens assemblies. The second assembly unit (a shift lens) has an image stabilization mechanism, and corrects on-screen image blur attributed to, for example, a camera shake during image capture by moving the second lens assembly holding frame 31 in a direction substantially perpendicular to an optical axis during image capture. The third lens assembly 3 is a focusing lens assembly for bringing an object into focus.

FIG. 1 shows an image capture standby state in which the lens assemblies are in a retracted state, that is, a housed state, whereas FIG. 2 shows an image capture state in which the first lens assembly holding frame 11, the second lens assembly holding frame 31, and the third lens assembly holding frame 41 have advanced in an optical axis direction. A sensor holder unit 500 includes a sensor holder 501, the third lens assembly 3, and an image sensor 5. The sensor holder 501 supports the image sensor 5 via a sensor plate 505, and an optical filter 4 interposed between the sensor holder 501 and a non-illustrated sensor rubber is placed in front of the image sensor 5. As shown in a perspective view of FIG. 3, in the present embodiment, one lens barrel is established by screwing a fixed cam ring 504, which is a constituent of a zoom mechanism, to the sensor holder unit 500.

Figure 4:
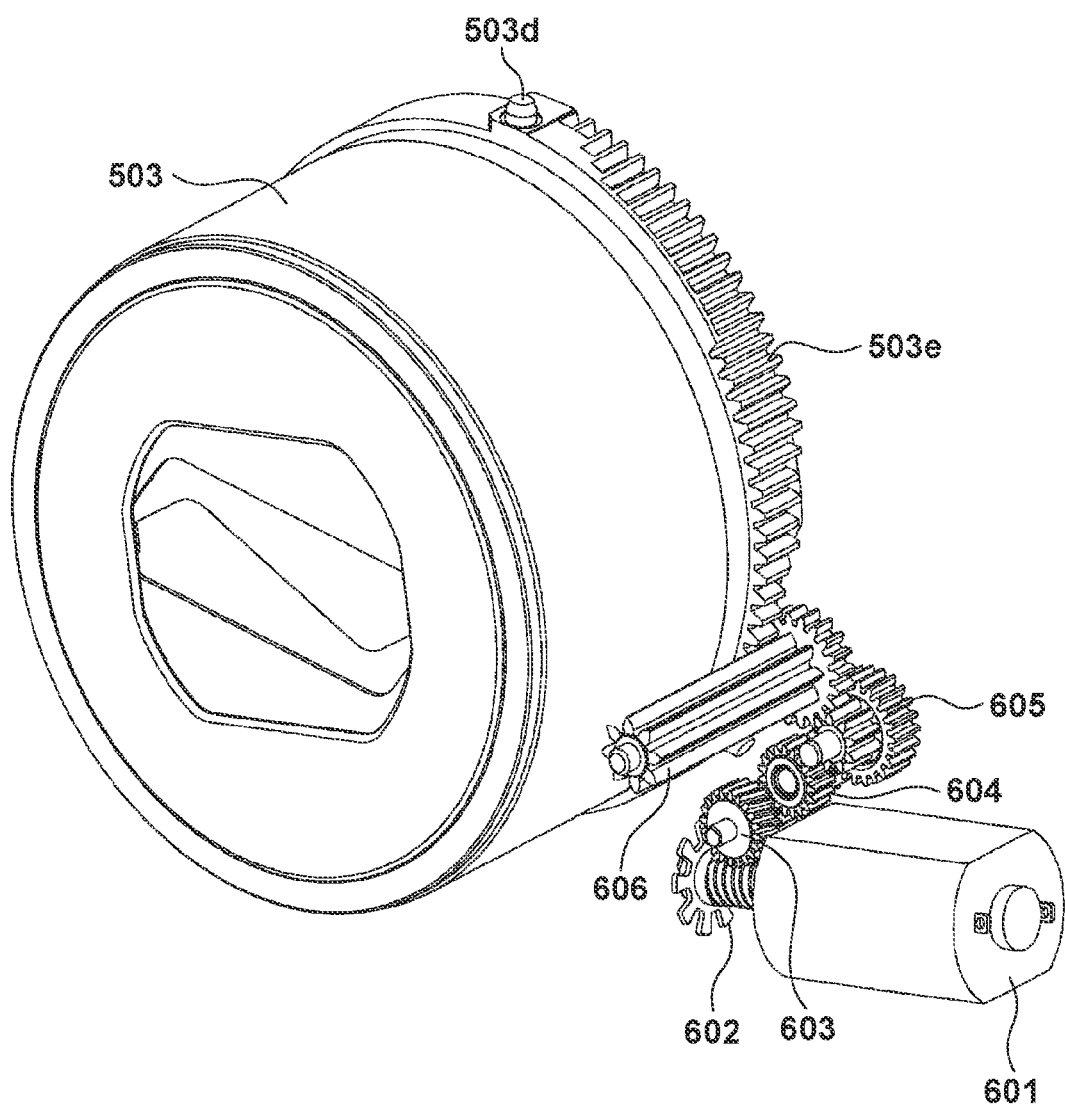
FIG. 4 is a detailed view of a zoom driving unit for the lens according to the first embodiment of the present invention.

As shown in FIGS. 3 and 4, the sensor holder 501 is provided with a zoom motor 601 and a gear train 603-606. A gear 602 is attached to a driving shaft of the zoom motor 601; a driving force of the zoom motor 601 rotates the gear 602, and this rotation is transmitted to lens barrel members via the gear train 603-606. As a result, the lens barrel is driven rectilinearly along the optical axis. The gear train 603-606 is composed of stepped gears each having a large-diameter gear portion and a small-diameter gear portion that have different numbers of teeth and are arranged coaxially. The last gear 606 that meshes with a moving cam ring 503 is also a stepped gear having a large-diameter gear portion and a small-diameter gear portion that has a lengthwise dimension along the optical axis.

A description is now given of barrel members and a zoom driving mechanism for moving the lens assemblies in the optical axis direction. As shown in FIGS. 1 and 2, the moving cam ring 503 is disposed around outer peripheries of the lens assemblies. As shown in FIG. 3, three types of cam grooves 503a, 503b, and 503c with different trajectories are formed on an inner periphery of the moving cam ring 503. Follower pins 12a, 21a, and 32a formed on outer peripheries of the first assembly base plate 12, the diaphragm unit 21, and the second assembly base plate 32 engage with these cam grooves to follow the movement of the moving cam ring 503.

As shown in FIGS. 1 to 3, a rectilinear guide barrel 502 is provided on the inner periphery of the moving cam ring 503 to restrict rotation when the lens assemblies move. The rectilinear guide barrel 502 and the moving cam ring 503 are connected to each other by a so-called bayonet mechanism, and move along the optical axis in a substantially integrated manner; furthermore, the moving cam ring 503 is rotatable relative to the rectilinear guide barrel 502. As shown in FIG. 3, the rectilinear guide barrel 502 has long grooves 502a, 502b, and 502c that extend along the optical axis. The first assembly base plate 12, the diaphragm unit 21, and the second assembly base plate 32 move rectilinearly along the optical axis because their rotation is restricted by these long grooves 502a, 502b, and 502c.

A cam groove 504a and a rectilinear guide groove 504b, which is a linear groove, are formed on an inner periphery of the fixed cam ring 504. As shown in FIG. 3, a follower pin 503d formed on an outer periphery of the moving cam ring 503 engages with and follows the cam groove 504a. The rectilinear guide barrel 502 also has a rectilinear restriction member 502d that is slidably fit in the guide groove 504b. A gear portion 503e is formed on the outer periphery of the moving cam ring 503 as shown in FIG. 3. Once driving of the zoom motor 601 has been started, the driving force is transmitted from the last gear 606 of the gear train 603-606 to the gear portion 503e of the moving cam ring 503, thereby initiating a rotation operation. Accordingly, the moving cam ring 503 not only rotates about the optical axis while engaging with and following the cam groove 504a formed on the inner periphery of the fixed cam ring 504, but also moves rectilinearly along the optical axis.

The gear portion 503e of the moving cam ring 503 meshes with the small-diameter gear portion of the last gear 606. The large-diameter gear portion of the last gear 606 is located posterior to this small-diameter gear portion along the optical axis (closer to the image sensor than this small-diameter gear portion is), and meshes with the gear 605. The long gear portion of the last gear 606 has a lengthwise dimension along the optical axis so as to conform to the movement of the moving cam ring 503 along the optical axis in concert with an amount of advancement of the moving cam ring 503. The rectilinear guide barrel 502 moves along the optical axis integrally with the moving cam ring 503. Note that the rectilinear guide barrel 502 moves only rectilinearly because its rotation is restricted by the rectilinear guide member 502d of the rectilinear guide barrel 502, which is slidably fit in the rectilinear guide groove 504b of the fixed cam ring 504.

With the foregoing configuration, a rotation operation of the moving cam ring 503 causes the first assembly unit, the diaphragm unit 21, and the second assembly unit that follow the moving cam ring 503 to move rectilinearly along the optical axis while being restricted in terms of rotation. As the fixed cam ring 504 is integrated with the sensor holder 501 by being screwed thereto as shown in FIGS. 1 to 3, it neither moves along the optical axis, nor rotates.

Figure 5B:
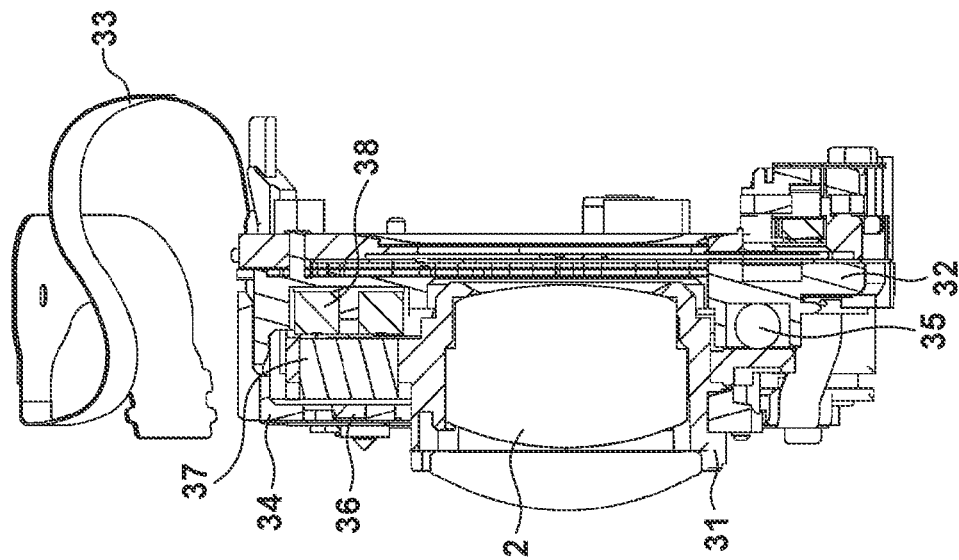
FIGS. 5A and 5B are respectively a front view and a cross-sectional view of a second assembly unit according to the first embodiment of the present invention.
Figure 5A:
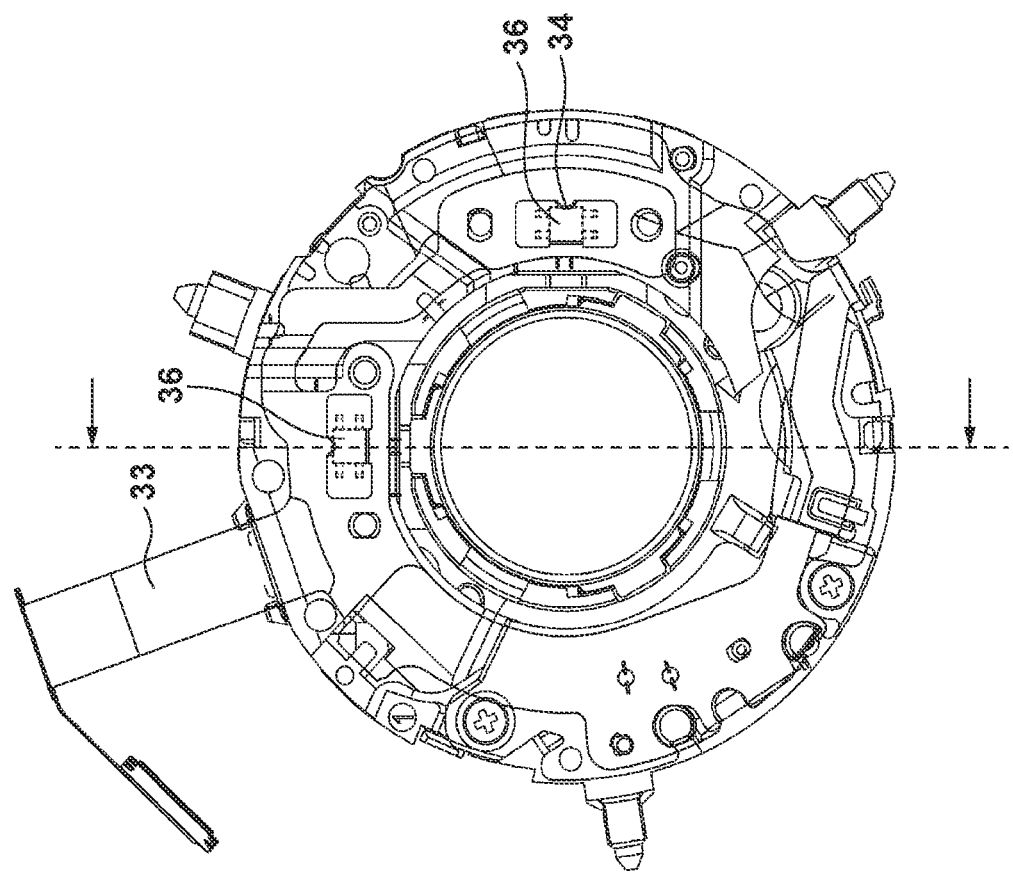

FIGS. 5A and 5B show a configuration of an image stabilization apparatus; specifically, FIG. 5A is a front view of the second assembly unit as viewed from an object, and FIG. 5B is a cross-sectional view taken along a line intersecting the lens center shown in FIG. 5A. The image stabilization apparatus will now be described with reference to FIGS. 5A and 5B.

In FIGS. 5A and 5B, a lens driving unit is provided on the second assembly base plate 32 near its outer periphery; as will be described later in detail, the lens driving unit moves the second lens assembly holding frame 31, which is composed of magnets 37 and coils 38 and holds the second lens assembly 2 serving as a shift lens (an optical element), in a direction perpendicular to the optical axis. A non-illustrated shutter driving unit that drives a shutter mechanism is provided on the second assembly base plate 32 near an outer periphery of the second lens assembly 2, and a non-illustrated ND driving unit that drives an ND filter is provided on the second assembly base plate 32 near an imaging plane.

The second lens assembly holding frame 31 and the second assembly base plate 32 are connected to each other along the optical axis by two extension springs (not shown). Due to a force exerted by the two extension springs, the second lens assembly holding frame 31 is propelled along the optical axis toward the second assembly base plate 32 with a ball 35 interposed therebetween. Rolling motion of the ball 35 causes the second lens assembly holding frame 31, which holds the second lens assembly 2, to move in the direction perpendicular to the optical axis.

Hall sensor holding units 34 are disposed on portions of the second assembly base plate 32 that face toward an object. A shutter flexible printed circuit (FPC) 33 is laid on the Hall sensor holding units 34 while being connected to the lens driving unit, the shutter driving unit, and the ND driving unit, and pulled toward the imaging plane along pullout surfaces at outer periphery portions of the Hall sensor holding units 34. Two Hall sensors 36 for detecting a position of the second lens assembly 2 are mounted on the shutter FPC 33 at a circumferential interval of 90 degrees. The Hall sensors 36 are electrically connected to a non-illustrated lens barrel FPC via the shutter FPC 33. The shutter FPC 33 is fixed to the Hall sensor holding units 34, and the Hall sensor holding units 34 are fastened to the second assembly base plate 32 by a snap-fit connection mechanism with the second lens assembly 2 interposed therebetween.

The second lens assembly holding frame 31 is provided with the magnets 37 that are magnetized in such a manner that the Hall sensors 36 lie between a north pole and a south pole, and a control unit of a camera body detects the magnetic fields that pass through the magnets 37 based on output from the two Hall sensors 36. A movement of the second lens assembly holding frame 31 on a plane perpendicular to the optical axis causes a change in the magnetic fields that pass through the Hall sensors 36, and in output from the Hall sensors 36; based on this, a position of the second lens assembly holding frame 31 in the direction perpendicular to the optical axis can be detected (detection of a driving amount).

The coils 38 are disposed to oppose the magnets 37 in such a manner that the former is closer to the imaging plane than the latter is in the optical axis direction; the coils 38 are attached to the second assembly base plate 32. The coils 38 are electrically connected to the non-illustrated lens barrel FPC via the shutter FPC 33, and thus receive power supplied from a power source unit of the camera body. Current flowing through the coils 38 generates an electromagnetic force, with which the second lens assembly holding frame 31 can be driven in the direction perpendicular to the optical axis.

Figure 6B:
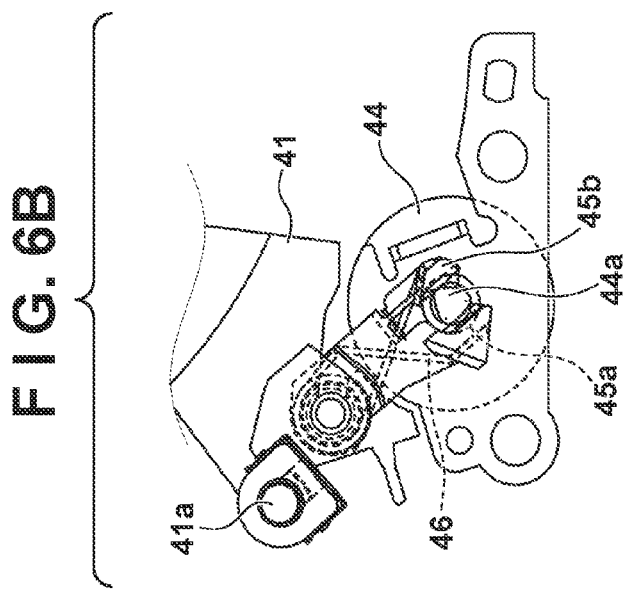
FIGS. 6A and 6B are exploded views of a third assembly unit according to the first embodiment of the present invention.
Figure 6A:
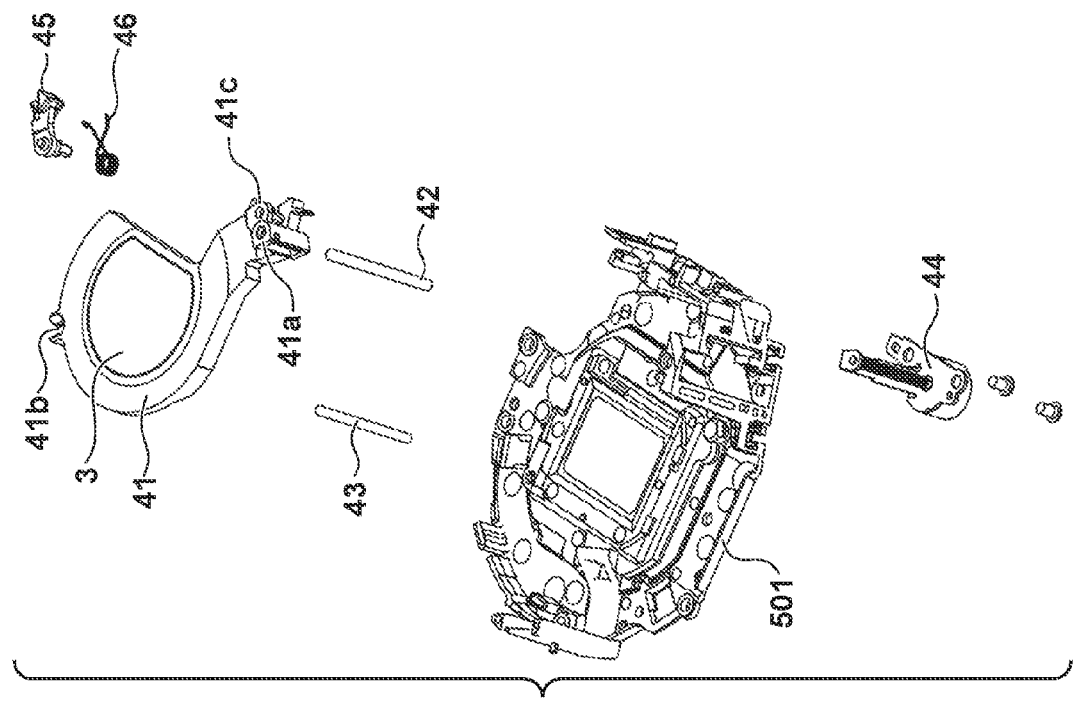

The following describes a configuration of a focus driving mechanism installed in the sensor holder unit 500 with reference to FIGS. 3, 6A, and 6B. The third lens assembly holding frame 41 is supported by the sensor holder 501 to be movable rectilinearly in the optical axis direction. That is, as shown in FIGS. 3, 6A, and 6B, a main guide shaft 42 parallel to the image capture optical axis is fixed in a hole portion of the sensor holder 501 by press-fitting, and a sub guide shaft 43 for restricting rotation is fixed in a hole portion of the sensor holder 501 by press-fitting similarly to the main guide shaft 42.

As shown in FIGS. 6A and 6B, a focus driving motor 44 is fixedly screwed to the sensor holder 501. The third lens assembly holding frame 41 has a sleeve 41a. The sleeve 41a has a sleeve hole that engages with the main guide shaft 42. The third lens assembly holding frame 41 also has a U-shaped groove 41b that engages with the sub guide shaft 43. The third lens assembly holding frame 41 also has a support hole 41c that is located in the vicinity of the sleeve 41a to support a rack 45.

The rack 45 includes a meshing tooth 45a that meshes with a lead screw 44a integrated with a motor output shaft, and a force application tooth 45b that opposes the meshing tooth 45a. The rack 45 also includes a support shaft that engages with the support hole 41c of the third lens assembly holding frame 41. The force application tooth 45b is pressed by an arm portion of a helical coil spring 46 in a direction of meshing with the lead screw 44a, and the arm portion of the helical coil spring 46 is hooked on a back surface portion of the rack 45. Accordingly, the force application tooth 45b and the meshing tooth 45a always mesh with the lead screw 44a, with the lead screw 44a interposed between the force application tooth 45b and the meshing tooth 45a.

Furthermore, the helical coil spring 46 applies a force to the rack 45 in a direction toward an end surface of the third lens assembly holding frame 41 in the optical axis direction to prevent slippage of the rack 45 and the third lens assembly holding frame 41; this enables stable and high-precision driving in the optical axis direction. With the foregoing configuration, rotation of the lead screw 44a of the focus driving motor 44 causes the third lens assembly holding frame 41 to advance and recede rectilinearly along the optical axis due to meshing between the rack 45 and the lead screw 44a.

FIG. 7 is a block diagram showing an exemplary configuration of a digital camera 100. Although the camera body and the lens 200 are integrated according to this configuration, the lens 200 may be interchangeably attached to the camera body. In FIG. 7, lens driving is performed with the lens assemblies held inside the lens 200. Although the lens 200 shown in FIG. 7 is the same as the lens 200 shown in FIGS. 1 to 6B, it is illustrated in a simplified manner in FIG. 7 to facilitate the understanding of the configuration. The first lens assembly (zoom lens assembly) 1 optically changes an angle of view by adjusting a focal length. The second lens assembly 2 is a shift lens movable in a direction different from the optical axis direction, and corrects image blur. The third lens assembly (focusing lens assembly) 3 adjusts a point of focus. A diaphragm/shutter 105 adjusts an amount of light for exposure control. Note that as shown in FIGS. 1 to 6B, the actual diaphragm 21 is interposed between the first lens assembly 1 and the second lens assembly 2, and a shutter is interposed between the second lens assembly and the third lens assembly. However, in FIG. 7, the diaphragm 21 and the shutter are collectively illustrated as the diaphragm/shutter 105 to facilitate the understanding of the description.

An image sensor 106 that uses, for example, a charge-coupled device (CCD) or complementary metal-oxide-semiconductor (CMOS) sensor receives light that has passed through the lens 200, and converts light signals into electrical signals. The electrical signals are input to an image processing circuit 107, undergo pixel interpolation processing, color conversion processing, and so forth, and are then transmitted to an internal memory 108 as image data.

A display unit 109 displays image data obtained through image capture together with, for example, image capture information. A compression/decompression processing unit 110 compresses and decompresses data stored in the internal memory 108 in accordance with its image format. A storage memory 111 stores various types of data, including parameters. A console unit 112 is a user interface that performs various types of menu operation and mode switching operation. For example, the console unit 112 can switch between still images and moving images and between manual focus and autofocus based on a user operation.

A shake detection unit 113 detects shaking and swaying of the image capturing apparatus. A diaphragm/shutter driving unit 114 drives the diaphragm/shutter 105. A luminance signal calculation unit 121 calculates luminances of an object from the electrical signals output from the image sensor 106. An exposure control unit 120 calculates exposure control values (an f-number and a shutter speed) based on luminance information obtained by the luminance signal calculation unit 121.

A focusing lens driving unit 115 drives the third lens assembly (focusing lens) 3. A focus control unit (focusing lens control unit) 123 controls a driving direction and a driving amount of the focusing lens 3. A scan control unit 124 issues an instruction for driving within a predetermined range to the focus control unit 123, and calculates the shape of contrast with reference to evaluation values (output signals) that are obtained as a result of computation by an evaluation value computation unit 122 at a predetermined position of the focusing lens 3. Autofocus (AF) control is performed by using a focus position (focus detection result) that yields the highest contrast as a position at which light beams focus on a plane of the image sensor 106.

A shift lens driving unit 116 drives the shift lens 2. A shift lens current position detection unit 117 detects a current position of the shift lens 2. Based on information from the shake detection unit 113, an image stabilization control unit (a driving control unit for the shift lens) 125 calculates a moving direction and a moving amount of the shift lens 2 for cancelling out image blur attributed to a shake of the image capturing apparatus. Image blur is cancelled out by driving the shift lens 2 based on the result of this calculation. A focus correction unit 126 corrects a position of the focusing lens 3 in accordance with a position of the shift lens 2.

A zoom lens driving unit 118 drives the first lens assembly (zoom lens assembly) 1. A zoom control unit 127 controls a driving direction and a driving amount of the zoom lens assembly 1 in accordance with a zoom operation instruction from the console unit 112. A system control unit 119 is composed of a computation apparatus, such as a central processing unit (CPU), and executes various types of control programs stored in the internal memory 108 in accordance with a user operation; examples of the control programs include programs for performing AE control, AF control, image stabilization control, zoom control, and so forth.

The console unit 112 includes a release button that turns ON a first switch (SW1) and a second switch (SW2) in succession in accordance with a depression amount. Herein, the first switch SW1 is turned ON when the release button is depressed approximately by half, and the second switch SW2 is turned ON when the release button is fully depressed. Once the first switch SW1 has been turned ON, the exposure control unit 120 computes exposure control values (an f-number and a shutter speed) based on luminance information obtained by the luminance signal calculation unit 121, and notifies the diaphragm/shutter driving unit 114 of the result of this computation. Automatic exposure (AE) control is performed accordingly. The evaluation value computation unit 122 calculates AF evaluation values after extracting components of a specific frequency from luminance signals calculated by the luminance signal calculation unit 121.

Once the second switch SW2 of the release button has been turned ON, the exposure control unit 120 performs image capture based on the determined f-number and shutter speed, and stores image data obtained by the image sensor 106 to the storage memory 111. In order to display so-called live-view images that are obtained when the release button is in a non-depressed state, the exposure control unit 120 preliminary determines an f-number and a shutter speed based on the aforementioned luminance information pertaining to video signals and on a program diagram at a predetermined interval in preparation for exposure for still image capture.

With reference to FIGS. 8A to 8D, the following describes a defocused state of an object that occurs when the shift lens, which is a feature of an optical system with an image stabilization function, has deviated from the optical axis. In FIGS. 8A to 8D, an X-axis indicates a position of the focusing lens, and a Y-axis indicates an evaluation value for object contrast; these figures show fluctuations in the position of the focusing lens and in the evaluation value for object contrast in relation to a predetermined object.

As shown in FIGS. 8A to 8D, the evaluation value for object contrast changes depending on the position of the focusing lens 3, and a difference between high contrast and low contrast is represented by a mountain shape. The apex of the mountain shape corresponds to a position that yields the highest object contrast, and an in-focus state is achieved when the focusing lens 3 is at this position.

Figure 8A:
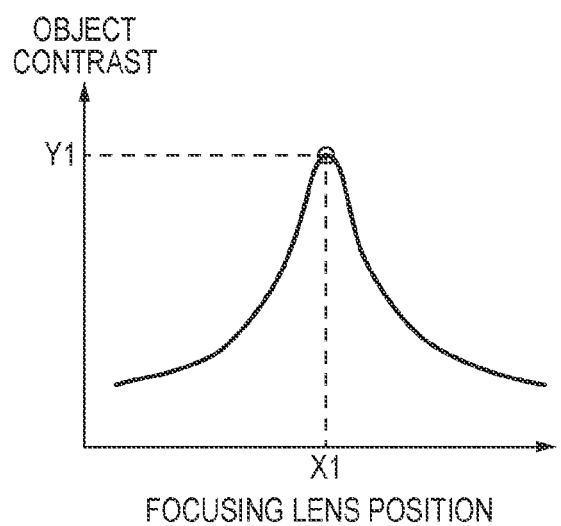
FIGS. 8A to 8D show a decrease in object contrast caused by a movement of a shift lens.
Figure 8B:
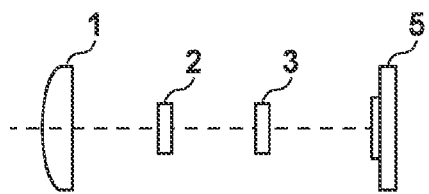
Figure 8C:
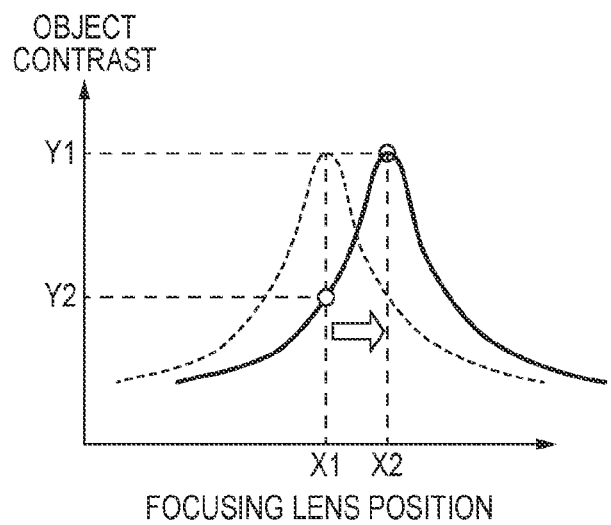
Figure 8D:
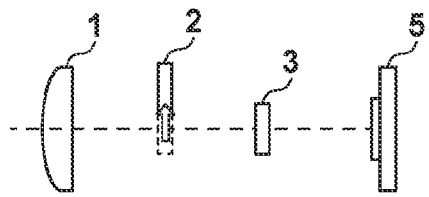

FIGS. 8A and 8B show evaluation values for object contrast and positions of the focusing lens for a case in which the shift lens 2 is on the optical axis together with other lens assemblies, and FIGS. 8C and 8D show evaluation values for object contrast and positions of the focusing lens for a case in which the shift lens 2 has deviated from the center of the optical axis on which other lens assemblies are positioned. Note that FIG. 8B is a schematic diagram depicting the case in which the shake correction lens is on the optical axis together with other lens assemblies, and FIG. 8D is a schematic diagram depicting the case in which the shake correction lens has deviated from the center of the optical axis on which other lens assemblies are positioned.

When the shift lens is on the optical axis as shown in FIG. 8B, the largest evaluation value for contrast is yielded when the focusing lens is at position X1 as shown in FIG. 8A. If this state changes to the state shown in FIG. 8D, that is, if the shift lens 2 is driven and deviates from the center of the optical axis, evaluation values for object contrast and positions of the focusing lens will satisfy the relationship shown in FIG. 8C. As a result, the mountain shape representing evaluation values for object contrast shifts to the right as shown in FIG. 8C. That is, the focusing lens position that yields the largest evaluation value for object contrast shifts from X1 to X2.

Assume a case in which an object has been brought into focus by moving the focusing lens 3 to position X1 and keeping it at position X1 while the shift lens 2 is on the optical axis together with other lens assemblies. In this case, if the shift lens 2 moves while the focusing lens 3 is kept at position X1, the evaluation value for object contrast drops from Y1 to Y2 as shown in FIG. 8C. If an image capture operation is performed in this state, the evaluation value for contrast remains small. Furthermore, as a camera shake caused by a photographer is not constant and varies with time, the movement of the shift lens is not constant, and object contrast changes constantly.

Figure 9:
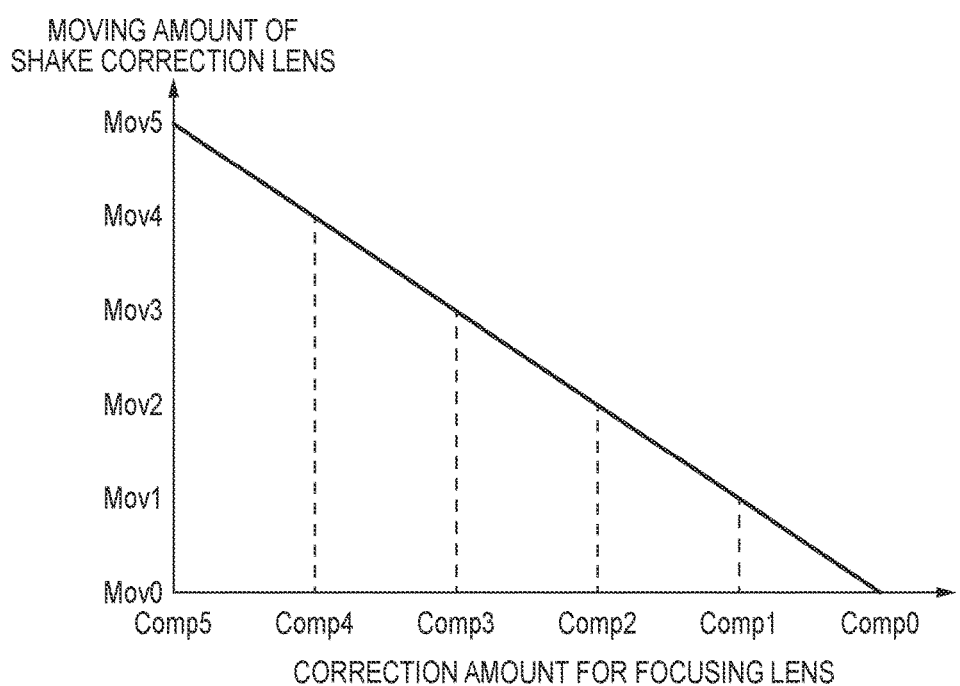
FIG. 9 shows a relationship between a moving amount of the shift lens and a correction amount for a focusing lens.

A description is now given of how the shift lens 2 and the focusing lens 3 operate before and after image capture in the present embodiment to solve the foregoing issues. FIG. 9 shows a relationship between a shift lens position and a correction amount for a focusing lens position.

In this figure, a Y-axis indicates a position of the shift lens 2 from the optical axis, and an X-axis indicates a correction amount by which a position of the focusing lens 3 is to be corrected upon driving of the shift lens 2. In FIG. 9, the shift lens 2 at position Mov0 means that the shift lens 2 is at position 0, that is, on the center of the optical axis. When the shift lens 2 is at position Mov0, the correction amount for the focusing lens position is Comp0. Specific numerical values of Mov0 and Comp0 are zero each.

On the other hand, in FIG. 9, the shift lens 2 at position Mov5 means that the shift lens 2 is farthest from the center of the optical axis. When the shift lens 2 is at position Mov5, the correction amount for the position of the focusing lens 3 is Comp5. The foregoing relationship between a position of the shift lens 2 and a moving amount of the focusing lens 3 is stored in the internal memory 108. Therefore, during image capture of a predetermined object, object contrast does not decrease on live-view images because the focusing lens 3 is moved by an amount corresponding to an amount of camera shake caused by a photographer (a moving amount of the shift lens 2).

The numerical values, including those of Mov5 and Comp5, vary depending on the properties of the optical system. Although the relationship between a position of the shift lens 2 and a correction amount for a position of the focusing lens 3 is represented by a straight line in FIG. 9, it may be represented by a curved line depending on the properties of the optical system.

As described above, in the present embodiment, the relationship between a moving amount of the shift lens 2 and a correction amount for a position of the focusing lens 3 is stored in the internal memory 108. However, driving of the focusing lens 3 in coordination with the movement of the shift lens 2 during exposure for a still image could possibly change an angle of view and degrade the image quality in a peripheral region. In view of this, the system control unit 119 can limit a moving amount of the focusing lens 3 in accordance with the length of a period of exposure for a still image.

Similarly, during moving image capture, driving of the focusing lens in coordination with the movement of the shift lens 2 could possibly change an angle of view and cause discomfort to a user. In view of this, during moving image capture, a moving amount and a moving speed of the focusing lens 3 related to focus correction can be limited to prevent a sudden change in the angle of view.

Furthermore, driving of the focusing lens 3 in coordination with the movement of the shift lens 2 gives rise to the problem of increased power consumption, which reduces the number of images that can be captured. In view of this, when there is a small fluctuation in focus due to a small moving amount of the shift lens 2, driving of the focusing lens 3 may be skipped, or a driving amount thereof may be limited.

Moreover, selection of a manual focus mode by a user may enable selection of a mode in which the focusing lens 3 is driven in coordination with the movement of the shift lens 2 or a mode in which such driving of the focusing lens 3 is not performed. This allows the user to perform image capture with freedom.

Figure 10:
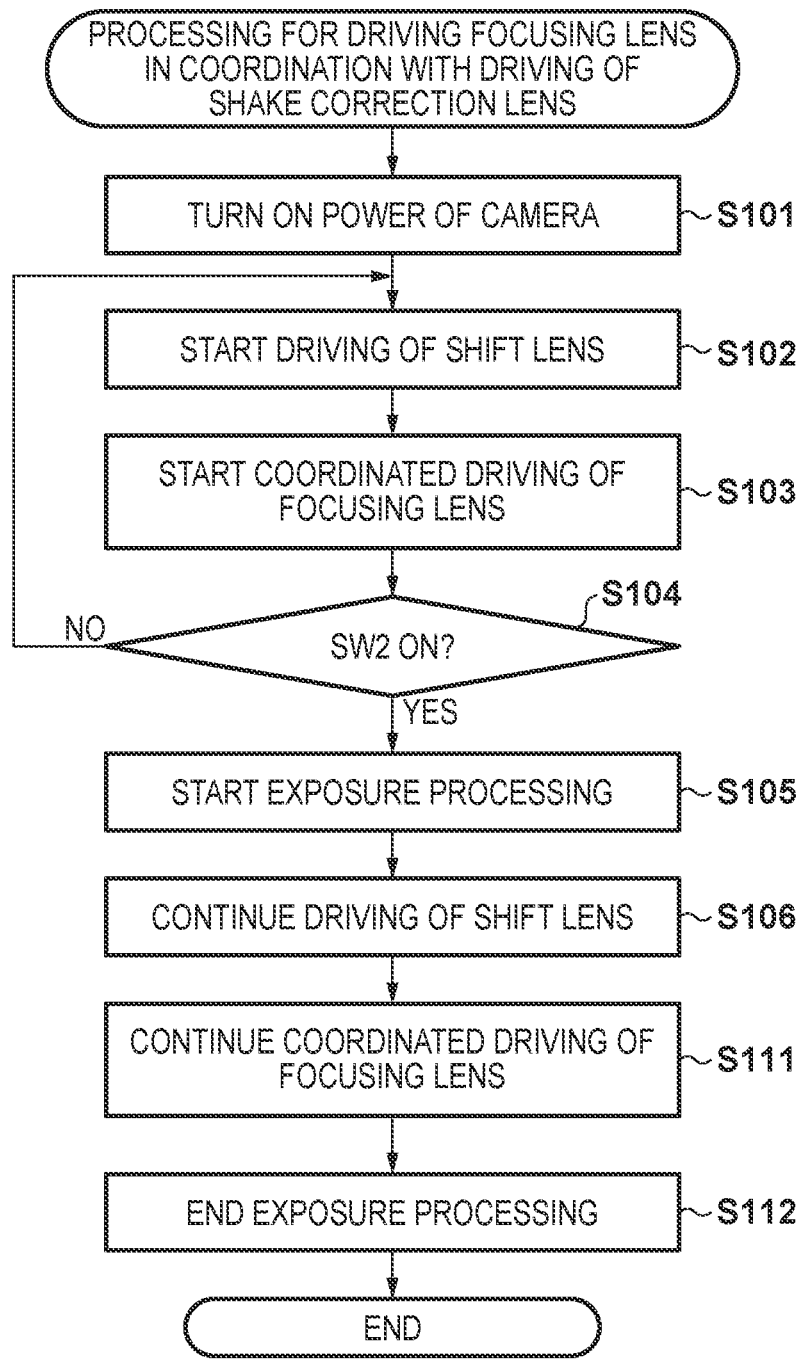
FIG. 10 is a flowchart of a focus correction operation according to the first embodiment.

FIG. 10 is a flowchart of processing for driving the focusing lens based on the movement of the shift lens in image capture performed on the camera. Note that the processing of the flowchart of FIG. 10 is executed under control of the system control unit 119.

First, when the power of the camera is turned ON in step S101, the system control unit 119 starts image stabilization control in accordance with an amount of camera shake caused by a photographer in step S102. In step S103, focus correction control is started using the focusing lens 3 in accordance with an amount of image stabilization by the shift lens 2. In step S104, whether the second switch (SW2) has been turned ON by depressing the release button is determined. If the second switch (SW2) has not been turned ON in step S104, the processing returns to step S102 while live-view images are being displayed, and the operations of steps S103 and S104 are repeated.

On the other hand, if the second switch (SW2) has been turned ON in step S104, a still image capture operation and exposure are started in step S105. In step S106, for the purpose of image stabilization, the system control unit 119 drives the shift lens 2 in accordance with an amount of camera shake during the exposure. Once the exposure has been started, it is determined that image capture is in execution, and the processing proceeds to step S111 in which the system control unit 119 starts to move the focusing lens 3 in coordination with the movement of the shift lens 2, thereby performing a focus correction operation. Thereafter, the processing proceeds to step S112 in which the exposure is ended.

Second Embodiment

A description is now given of a second embodiment of the image capturing apparatus of the present invention. As the image capturing apparatus according to the second embodiment is configured in the same manner as the image capturing apparatus according to the first embodiment, only the differences between the first embodiment and the present embodiment will be described below. The second embodiment differs from the first embodiment in the operations of moving the shift lens and the focusing lens during exposure in the presence of an object.

FIG. 11 is a flowchart of processing for driving the focusing lens based on the movement of the shift lens in image capture performed on the camera. Note that the processing of the flowchart of FIG. 11 is executed under control of the system control unit 119.

First, when the power of the camera is turned ON in step S201, the system control unit 119 starts image stabilization control in accordance with an amount of camera shake caused by a photographer in step S202. In step S203, focus correction control is started using the focusing lens 3 in accordance with an amount of image stabilization by the shift lens 2. In step S204, whether the second switch (SW2) has been turned ON by depressing the release button is determined. If the second switch (SW2) has not been turned ON in step S204, the processing returns to step S202 while live-view images are being displayed, and the operations of steps S203 and S204 are repeated.

On the other hand, if the second switch (SW2) has been turned ON in step S204, a still image capture operation and exposure are started in step S205. In step S206, for the purpose of image stabilization, the system control unit 119 drives the shift lens 2 in accordance with an amount of camera shake during the exposure. Once the exposure has been started, the system control unit 119 determines that image capture is in execution, and proceeds to step S207 to determine whether a calculated exposure period is equal to or shorter than a predetermined period. If the exposure period is longer than the predetermined period in step S207, the system control unit 119 proceeds to S208 and either limits a movable range of the focusing lens 3 for focus correction, or prevents its movement. Thereafter, the processing proceeds to step S212 in which the exposure is ended.

If the exposure period is equal to or shorter than the predetermined period in step S207, the system control unit 119 proceeds to step S209 and determines whether a calculated moving amount of the focusing lens 3 is equal to or smaller than a predetermined amount. If the moving amount of the focusing lens 3 is equal to or smaller than the predetermined amount in step S209, the system control unit 119 proceeds to step S210 and either limits one of a moving range and a driving speed of the focusing lens or prevents its movement. Thereafter, the processing proceeds to step S212 in which the exposure is ended.

On the other hand, if the moving amount of the focusing lens 3 is larger than the predetermined amount (a predetermined threshold) in step S209, the system control unit 119 proceeds to step S211 and starts to move the focusing lens 3 in coordination with the movement of the shift lens 2, thereby performing a focus correction operation. Thereafter, the processing proceeds to step S212 in which the exposure is ended.

Although the foregoing present embodiment has introduced the operations of limiting the moving amount of the focusing lens based on the exposure period, some optical systems may not require such limitation on the moving amount of the focusing lens. Therefore, the operations of the present invention are not limited to the flowchart of FIG. 11.

Although the present invention has been described using the image capturing apparatus as an example, the present invention is not limited to the foregoing embodiments, and covers various embodiments within the scope of the principles of the present invention.

For example, although focus correction is performed using the focusing lens in coordination with the movement of the shift lens during exposure in the foregoing embodiments, control for preventing the movement of the focusing lens may be performed during exposure because the image quality in a peripheral region is degraded by a change in an angle of view caused by the movement of the focusing lens.

Although the zoom lens has been described as a lens barrel composed of three assemblies in the foregoing embodiments, it may not be composed of three assemblies. Furthermore, although the shift lens has been described as one lens assembly, the present invention is also applicable when image stabilization is performed using two shift lens assemblies (when the shift lens assembly is provided in plurality). In this case, it is sufficient to calculate an amount of focus correction by the focusing lens from the amounts of image stabilization by the two shift lens assemblies.

Instead of the lens, the image sensor may perform image stabilization by moving on a plane perpendicular to the optical axis.

The shift lens may be configured to not only move on a plane perpendicular to the optical axis, but also be tilted about a rotation axis, which is an arbitrary central axis on the optical axis.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-077578, filed Apr. 7, 2016, which is hereby incorporated by reference herein in its entirety.

What is claimed is:
1. An image stabilization apparatus, comprising:
a driving control unit that drives an optical element to optically correct image blur of an object image caused by a shake of an image capturing apparatus, the optical element moving the object image on a screen of an image capturing device, the optical element being provided in an imaging optical system and moves in a direction different from a direction of an optical axis of the imaging optical system; and
a focus control unit that performs control to drive a focusing lens in the direction of the optical axis of the imaging optical system to perform focus adjustment in the imaging optical system, the focusing lens being used to correct a defocused state of the object image caused by driving the optical element to optically correct image blur of the object image, in coordination with an operation of the optical element, during a period of exposure for a still image, wherein each unit is implemented by one or more processors, circuitry or a combination thereof.

2. The image stabilization apparatus according to claim 1, further comprising a shake detection unit that is implemented by the one or more processors, circuitry or a combination thereof and detects the shake of the image capturing apparatus, wherein the driving control unit drives the optical element to correct the image blur of the object image based on output from the shake detection unit.

3. The image stabilization apparatus according to claim 1, further comprising a driving amount detection unit that is implemented by the one or more processors, circuitry or a combination thereof and detects a driving amount of the optical element, wherein the focus control unit drives the focusing lens in accordance with the driving amount of the optical element detected by the driving amount detection unit.

4. The image stabilization apparatus according to claim 3, further comprising a focus detection unit that is implemented by the one or more processors, circuitry or a combination thereof and performs focus detection based on an output signal from the image capturing device, wherein the focus control unit drives the focusing lens in accordance with a result of the focus detection performed by the focus detection unit and the driving amount of the optical element detected by the driving amount detection unit.

5. The image stabilization apparatus according to claim 1, wherein during exposure of the image capturing device, the focus control unit limits a driving amount of the focusing lens.

6. The image stabilization apparatus according to claim 1, wherein during moving image capture, the focus control unit limits a driving amount or a driving speed of the focusing lens.

7. The image stabilization apparatus according to claim 1, wherein when the optical element has a plurality of moving members, the focus control unit drives the focusing lens in coordination with driving of each moving member.

8. The image stabilization apparatus according to claim 1, wherein during manual focus, a mode in which the focusing lens is not driven in coordination with the operation of the optical element is selectable.

9. The image stabilization apparatus according to claim 1, wherein the optical element that is provided in the imaging optical system moves in a direction different from a direction of an optical axis of the imaging optical system.

10. The image stabilization apparatus according to claim 1, wherein the optical element moves the image capturing device in a direction perpendicular to an optical axis of the imaging optical system.

11. A method of controlling an image stabilization apparatus, the method comprising:

driving an optical element to optically correct image blur of an object image caused by a shake of an image capturing apparatus, the optical element moving the object image on a screen of an image capturing device, the optical element being provided in an imaging optical system and moving in a direction different from a direction of an optical axis of the imaging optical system; and performing control to drive a focusing lens in the direction of the optical axis of the imaging optical system to perform focus adjustment in the imaging optical system to correct a defocused state of the object image caused by driving the optical element to optically correct image blur of the object image, in coordination with an operation of the optical element, during a period of exposure for a still image.

12. A non-transitory computer-readable storage medium having stored therein a program for causing a computer to execute a method of controlling an image capturing apparatus, the method comprising:

driving an optical element to optically correct image blur of an object image caused by a shake of an image capturing apparatus, the optical element moving the object image on a screen of an image capturing device, the optical element being provided in an imaging optical system and moving in a direction different from a direction of an optical axis of the imaging optical system; and performing control to drive a focusing lens in the direction of the optical axis of the imaging optical system to perform focus adjustment in the imaging optical system, the focusing lens being used to correct a defocused state of the object image caused by driving the optical element to optically correct image blur of the object image, in coordination with an operation of the optical element, during a period of exposure for a still image.

* * * * *